June 13, 1950 G. R. W. MATHESON 2,511,118
GAS GENERATING DEVICE
Filed Nov. 29, 1945 5 Sheets-Sheet 2

Inventor
G. R. W. Matheson
By G. S. Roxburgh
His Atty

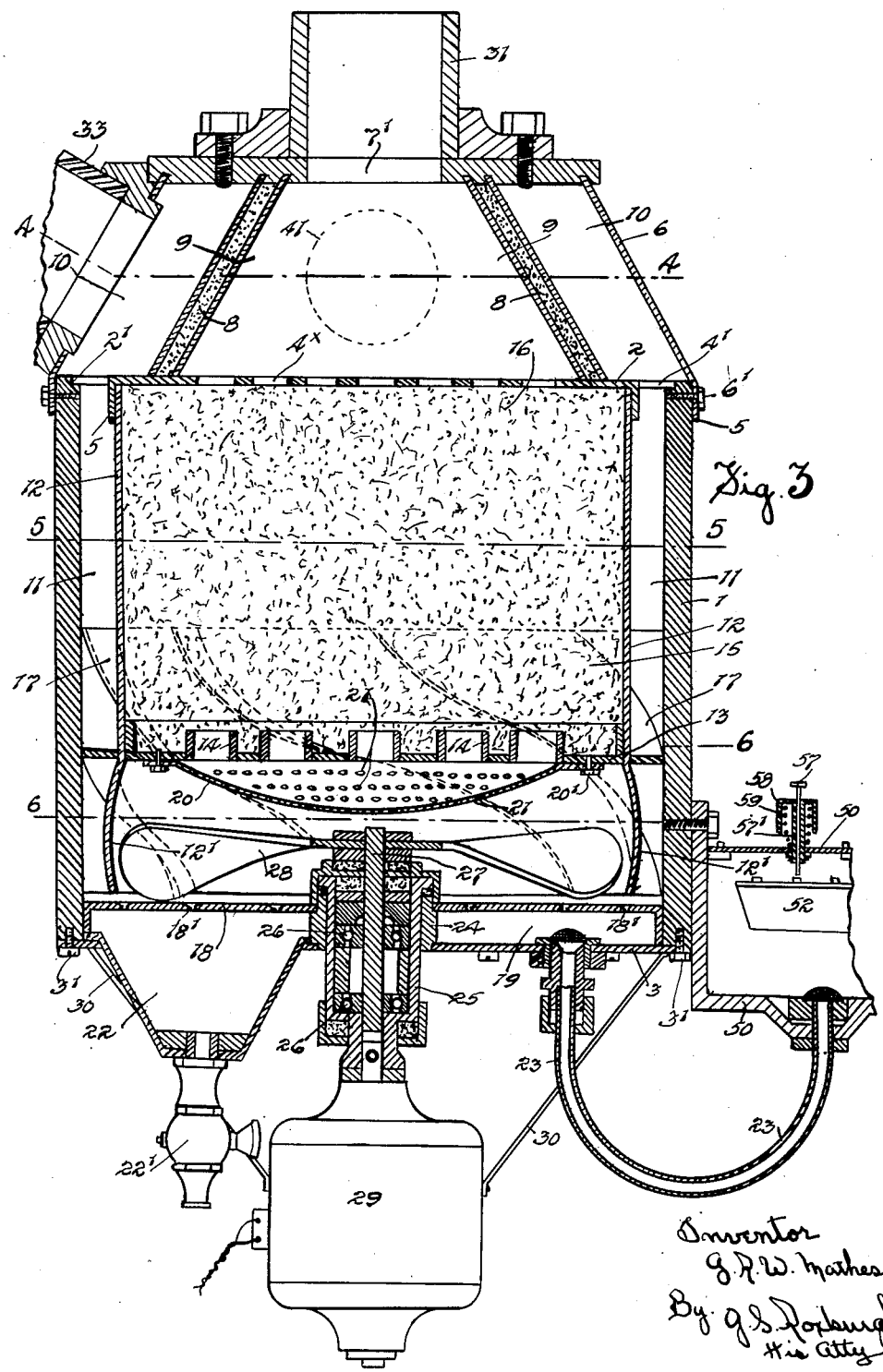

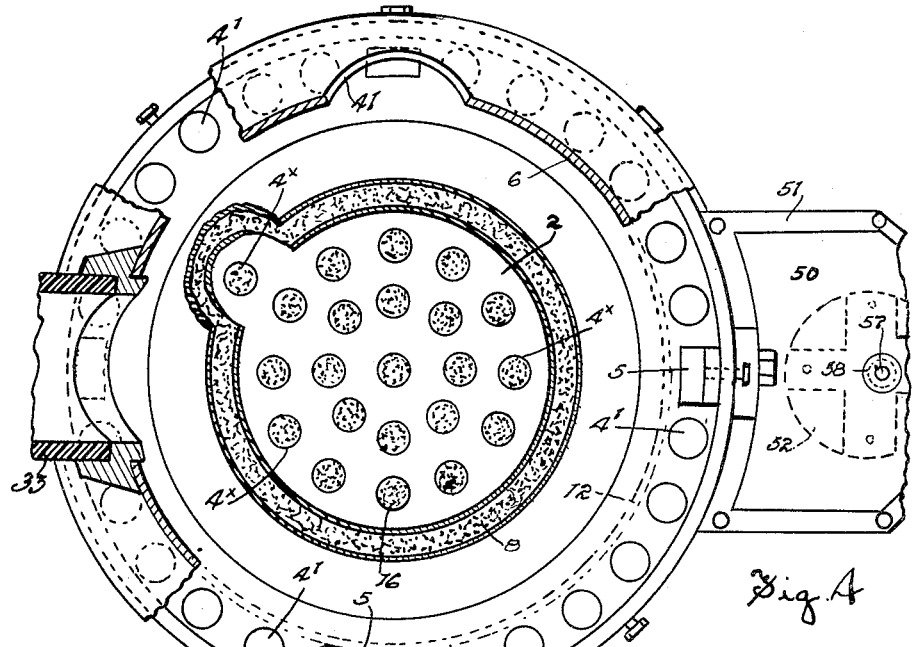
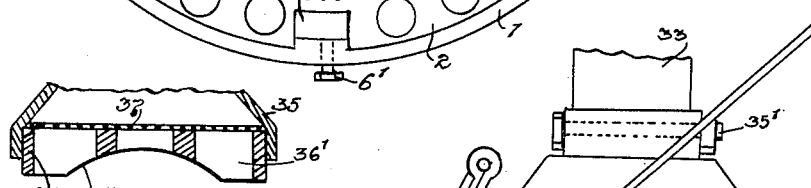
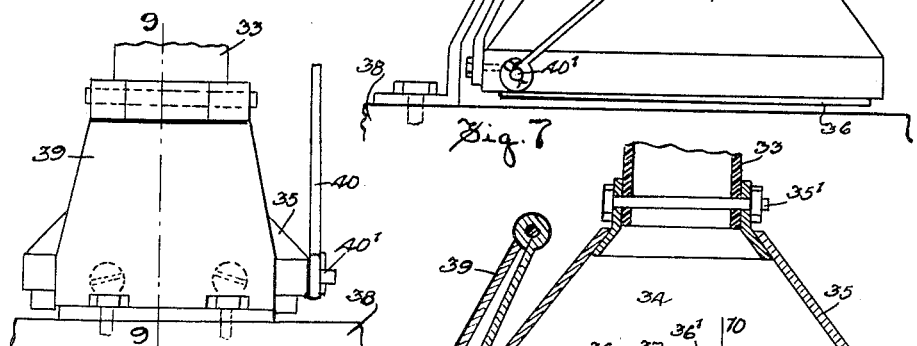

June 13, 1950   G. R. W. MATHESON   2,511,118
GAS GENERATING DEVICE
Filed Nov. 29, 1945   5 Sheets-Sheet 5

Inventor
G. R. W. Matheson
By G. S. Roxburgh
His Atty

Patented June 13, 1950

2,511,118

UNITED STATES PATENT OFFICE 2,511,118

GAS GENERATING DEVICE

Gilbert R. W. Matheson, Winnipeg, Manitoba, Canada

Application November 29, 1945, Serial No. 631,604
In Canada November 7, 1942

4 Claims. (Cl. 183—16)

1

The invention relates to a gas generating device and one of the objects of the invention is to provide a device which will intimately mix liquid hydrocarbon and air in regulated quantities to serve as an efficient firing mixture for internal combustion engines.

A further object is to provide a device wherein liquid fuel vapour is jetted from a fuel well into the path of a swirling stream of air to be initially intimately mixed therewith and then to filter the mixture prior to liberating it to the induction pipe and further to provide means whereby the temperature and quantity of admitted air can be controlled.

A further object is to provide a float valve for controlling the level of the liquid fuel in the well and to supply a perforated baffle plate above the well through which fuel vapor can rise to a mixing chamber thereabove and to direct air at desired temperature in a downward swirling stream towards the plate to effectively initially mix the vapour.

A further object is to provide a fan in the mixing chamber operating to break up and more intimately mix the vapour and air and, if power driven, to forcibly propel the mixture upwardly to the filtering chamber and to provide a variable speed motor for forcibly driving the fan as and when required.

A further object is to provide the bottom of the filtering chamber with relatively short, distributing, admission tubes and to locate a perforated breather plate between the fan and said tubes.

A further object is to provide a breather for heating one source of air admitted to the device, said breather having means whereby it can be adjustably mounted say on the exhaust manifold of an engine and a flexible pipe connection connecting it to an air inlet of the device.

With the above more important objects in view, the invention consists essentially in the arrangement and construction of parts now described, reference being had to the accompanying drawings in which:

Fig. 3 is an enlarged detailed vertical sectional view through the generating device.

Fig. 4 is a horizontal sectional view at 4—4 Fig. 3 certain parts being broken away to expose construction.

2

Fig. 3, certain parts being broken away to expose construction.

Figure 1:
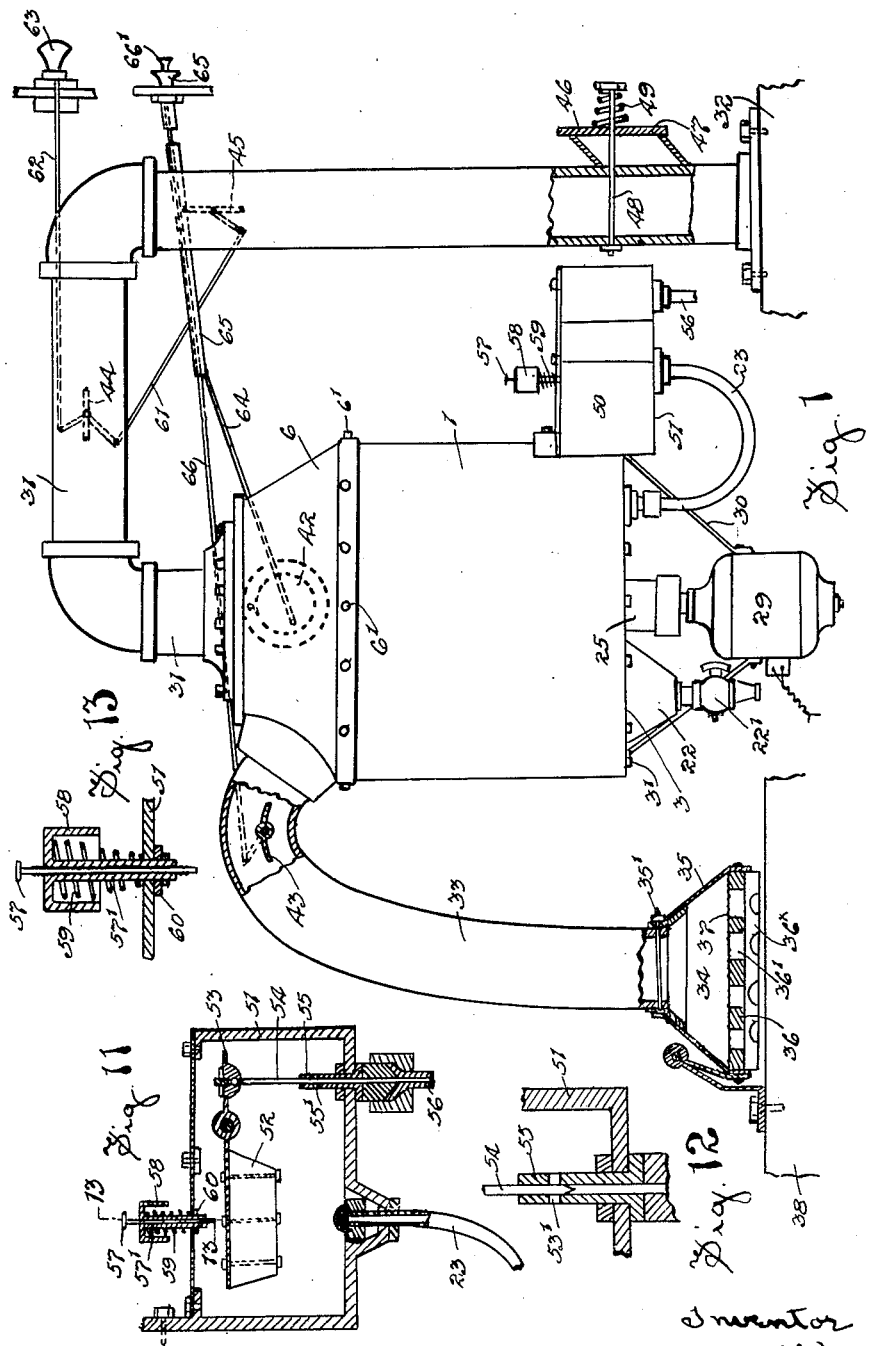
Fig. 1 is a side view of the gas generating device with connections.
Figure 2:
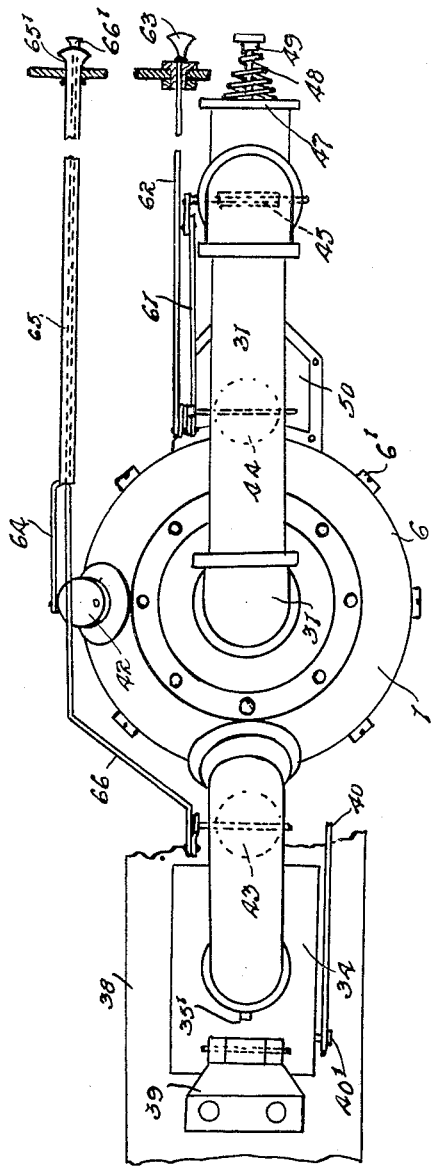
Fig. 2 is a plan view thereof.
Figure 5:
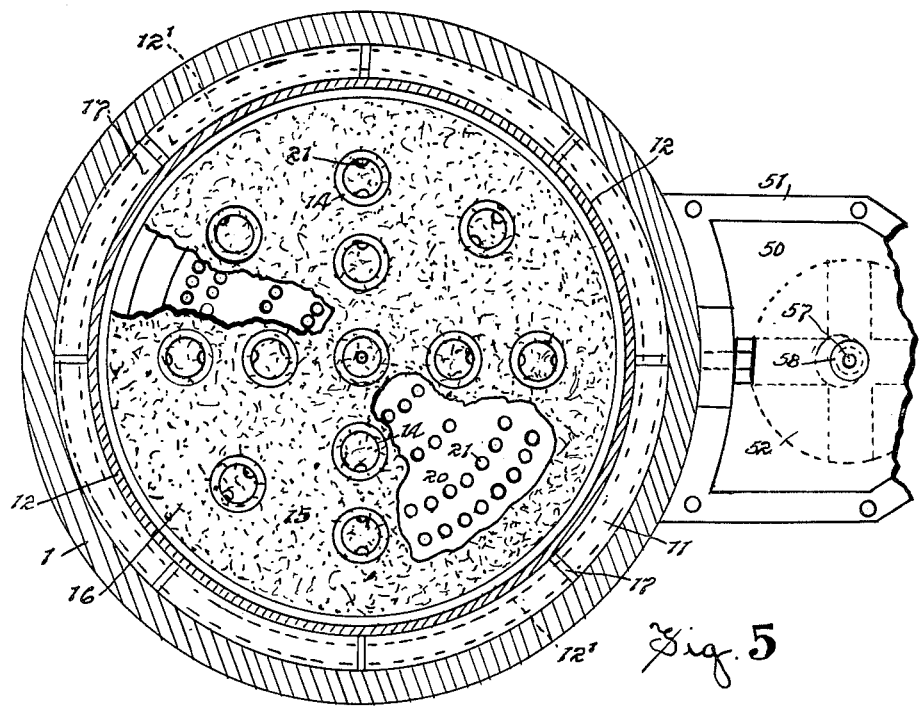
Fig. 5 is a horizontal sectional view at 5—5
Figure 6:
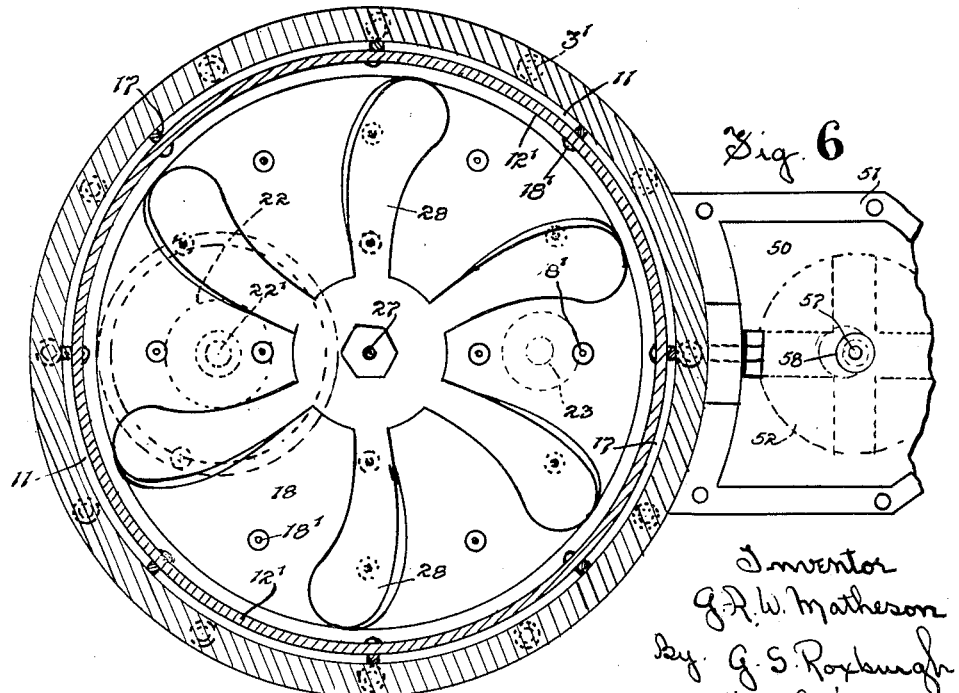

Fig. 6 is a horizontal sectional view at 6—6 Fig. 3.

Fig. 7 is an enlarged detailed front view of the breather.

Fig. 8 is an end view of the breather.

Fig. 9 is a vertical sectional view at 9—9 Fig. 8.

Fig. 10 is a vertical sectional view at 10—10 Fig. 9.

Fig. 11 is a vertical sectional view centrally through the float valve.

Fig. 12 is an enlarged vertical sectional view centrally through the needle valve.

Fig. 13 is an enlarged detailed vertical sectional view at 13—13 Fig. 11.

In the drawings like characters of reference indicate corresponding parts in the several figures.

The cylindrical casing 1, of the generating device has the ends thereof closed by head and base plates 2 and 3, the plate 3 being fastened by screws 3' to the lower end of the casing and the plate 2 resting in a rabbet 2' supplied in the upper end of the casing. The head plate is provided with an outer series of openings 4' and with an inner series of openings $4^x$ and carries a number of down-turned lugs 5.

A frusto-conical head 6 overlies the casing being fastened thereto by screws 6' and the head carries a top plate 7 welded thereto and provided with a central outlet opening 7'. The area within the head is divided by an insulated, divisional wall 8 to provide inner and outer chambers 9 and 10, the chamber 9 communicating with the openings $4^x$ and 7' and the chamber 10 with the openings 4'.

Within the casing and spaced therefrom to provide an annular passage way 11 is a cylindrical shell 12 which has the upper end engaging the plate 2 and welded to the lugs 5 and the lower end terminating in a buldged skirt 12'. Immediately above the skirt the shell is provided with a horizontal partition 13, welded thereto and the partition carries a number of upstanding relatively short tubes 14 which provide inlet passages to the chamber 15 within the shell. This chamber is filled with a filtering material 16 consisting preferably of copper cuttings.

In the lower portion of the passage 11, I locate a number of spiralling vanes 17 which terminate at the base of the skirt and effect a deflection of the air passing downwardly through such passage.

A baffle plate 18 is welded to the lower end of the casing 1 in a location slightly below the skirt and said plate is supplied with a plurality of relatively small orifices 18' which connect the well 19 beneath the plate and a mixing chamber thereabove. It will be observed that the outer orifices virtually underlie the lower edge of the skirt.

A concavo-convex breather plate 20 underlies the tubes 14 and is secured to the partition 13 by screws 20'. The breather plate is supplied with a plurality of apertures or holes 21.

The bottom plate 3 is supplied with a sump 22 fitted with a drain cock 22' and has a screened liquid fuel pipe 23 opening therethrough to the well.

A central collar or annular ring 24 connects the plates 3 and 18 and this receives a liquid and gas tight case 25 containing ball bearings 26 for a fan shaft 27. The upper end of the fan shaft has the fan 28 secured thereto and the lower end of the said shaft is coupled to a variable speed electric motor 29 suitably suspended from the casing 1 by supporting hangers 30.

The fan operates directly above the baffle plate 18 and within the lower end of the skirt and acts when operating as a mixer and blower.

An induction pipe 31 communicates with the outlet 7' and leads to say the intake manifold 32 of the internal combustion engine or other point where gas is to be consumed as fuel. A flexible pipe 33 opens through suitable connections to the annular passage 10 and the remote end of the pipe has a breather 34 connected thereto, the details of which are now described. The flaring hood 35 of the breather is bolted at 35' to the pipe and the lower end of the hood contains a relatively thick substantially rectangular cast iron plate 36 supplied with breather holes or openings 36'. A screen 37 is placed over the plate and crosses the openings and the underside of the plate is longitudinally channelled as indicated at 36ˣ so that when the breather is placed say over the conventional exhaust manifold 38 of an internal combustion engine, air can flow freely into flexible pipe through the passage so provided.

Provision is made so that one can raise or lower the breather in relation to the exhaust manifold and such comprises a hinged member 39 secured to the said manifold and breather and an adjusting rod 40 pivotally attached at 40' to the side of the hood and arranged so that it can be adjustably set in any desired position. Obviously by shifting and setting the rod 40 one can adjust the position of the breather in relation to the exhaust manifold and by so doing vary the extent of heating of the air admitted to the flexible pipe.

The head 6 has an opening 41 therein to admit auxiliary air to the passage 10 and such opening is controlled by a pivoted inlet valve 42. The pipe 33 is supplied with a choke valve 43 and the induction pipe 31 is supplied with a throttle valve 44, auxiliary valve 45 and a back fire valve 46. The latter valve closes a port 47 to the pipe and is slidably mounted on a carrying rod 48 extending from the pipe and fitted with a spring 49 which yieldingly holds said valve normally seated.

A float valve indicated generally by the number 50 is used to control the passage of the liquid fuel to the well 19 and such valve is secured by screws to the side of the casing 1 as shown. The float valve comprises a closed casing 51 which contains a float 52 having an extended arm 53, pivotally carried by a cross bolt 53' secured to the sides of the casing. The end of the arm remote from the float, has the upper end of a needle valve 54 pivotally connected thereto in the well known manner and the lower end of the valve is slidably received in a sleeve 55 carried by the casing and provided with entry ports 55'. The sleeve communicates with a feed line 56 for liquid fuel such as gasoline. The fuel pipe 23 connects the float valve to the well 19.

Centrally above the float I locate a spindle 57 which screw threads into a tube 57' passing slidably through the top of the casing 51. The tube carries a cap 58 and between the cap and the top of the casing I insert a coil spring 59 which acts to maintain the tube in an up position that is with the stop collar 60 fastened to the tube, engaging the underside of the casing top. With this arrangement I can adjust the spindle in relation to the float or can depress the sleeve and spindle simultaneously by a down pressure on the cap.

Means is provided for controlling the valves 42, 43, 44 and 45 such being arranged for convenient operation by an attendant. In the present showing, which may be materially modified, the valves 44 and 45 are connected together by a valve rod 61 and the valve 44 is actuated by a push-pull operating rod 62 fitted with a suitable handgrip 63.

The valve is shown as actuated by a rod 64 secured to a sleeve provided with a hand grip 65' and the valve 43 appears as actuated by a rod 66 passing slidably through the tube and provided with a hand grip 66'.

A brief description of the operation of the gas generating device is now given and in this connection it is mentioned that under varying working conditions the motor 29 may or may not be energized. The fan may be driven by the motor at varying speeds or may revolve freely when the motor is not energized this due to the fact that the motor armature to which the fan shaft is connected is at such times free, to revolve.

The liquid hydrocarbon such as gasoline feeds to the float valve chamber, the level of the fuel in the chamber being controlled by the float and needle valve in the well known way. Suction in the intake manifold 32 of the engine with which the device is herein associated causes a flow of liquid fuel and air to the device, the air being admitted in regulated quantities by the adjustable valves 42 and 43 and the fuel by way of the pipe 23 to the well 19. Heated air enters the chamber 10 from the breather 34 through the pipe 33 and auxiliary nonheated air enters the said chamber through the opening 41, the quantity of air being regulated by the valves 43 and 42 respectively. The air mixture, at a desired temperature flows through the opening 4' down the passage 11 and in passing is deflected by the vanes and is liberated in a swirling stream directly over the plate 18.

With or without the motor 29 operating, the suction of the engine causes a high velocity air flow into and through the maxing chamber and also into and over the fuel in the well, the latter air passing downwardly into the well through the outer openings 18' and back up into the mixing chamber through the intermediate and inner openings 18' and the former air passing into the mixing chamber in a swirling movement directly under the lower edge of the skirt. The air passing underneath the plate 18 initially mixes with the liquid fuel and vapour and is drawn up through the inner and intermediate openings 18' which it will be observed are at what might be called the lifting point of the fan. The high velocity air flow rotates the fan and the fan operates to break up the mixture in the mixing chamber. The openings 18' are approximately 1/64 inch in diameter in actual practice and the mixture going through the inner and intermediate openings is accordingly jetted into the mixing chamber.

If the fan is power driven the above action is intensified.

From the mixing chamber the mixture passes upwardly through the apertures of the breather plate 20 and then through the short tubes 14 where it is effectively filtered by the copper clippings before escaping through the openings 4ˣ to the chamber 9 and from the chamber 9 to the induction pipe 31 which feeds the final firing mixture to the motor cylinders by way of the intake manifold 32. An attendant will regulate the valves 42 and 43 to best advantage to control the air supply and temperature and he will also regulate the valves 44 and 45 to control the flow of the firing mixture through the induction pipe.

What I claim as my invention is:

1. In a gas generating device, a cylindrical casing having the ends thereof closed by head and base plates, the base plate confining a well for liquid fuel, means for feeding liquid fuel in regulated quantities to the well, a cylindrical shell spaced from and supported within the casing to provide an annular air passage therebetween and an interior receptacle for a filtering material, said shell having its lower end terminating above the well in a skirt, a perforated partition crossing the shell above the skirt, a baffle plate secured to the casing and underlying the skirt and above the fluid level in the well, said partition, baffle plate and skirt confining a mixing chamber, and said baffle plate being provided with a plurality of relatively small outer orifices underlying the skirt and opening to the well and with a plurality of relatively small inner orifices connecting the well with the mixing chamber, spaced vanes spiralling around the shell and crossing the annular passage and terminating at the base of the skirt, means for directing atmospheric air to the air passage through the head plate and an outlet communicating through the head plate with the interior of the shell.

2. In a gas generating device, a cylindrical casing having the ends thereof closed by head and base plates, the base plate confining a well for liquid fuel, and the head plate being provided with an inner and an outer series of openings, means for feeding liquid fuel to the well in regulated quantities, a cylindrical shell carried by the head plate and spaced from the casing to provide an annular air passage therebetween, and having the lower end thereof terminating in an outwardly bulging skirt, a perforated partition crossing the shell above the skirt, a filtering material within the shell between the partition and the head plate, a horizontal baffle plate secured to the casing and underlying the skirt and above the fuel in the well, said baffle plate, skirt and partition confining a mixing chamber, and said baffle plate being provided with a plurality of relatively small outer orifices underlying the skirt and communicating with the well and with a plurality of relatively small inner orifices connecting the well with the mixing chamber, a head secured to the upper end of the casing and interiorly divided by a divisional wall to provide an inner chamber communicating through the inner openings of the head plate with the interior of the shell and an outer annular chamber communicating through the outer openings of the head plate with the annular air passage, an outlet pipe leading from the inner chamber of the head, an air inlet pipe communicating with the outer chamber of the head and spaced spiralling vanes in the annular air passage and terminating at the base of the skirt.

3. The device as claimed in claim 2 wherein hot air is admitted to the outer chamber of the head and the divisional wall between the chambers of the head is insulated.

4. The device as claimed in claim 1 wherein a perforated concavo-convex breather plate underlies the perforated partition and a driven mixing fan is located within the mixing chamber beneath the breather plate and above the baffle plate.

GILBERT R. W. MATHESON.

REFERENCES CITED

The following references are of record in the file of this patent:

UNITED STATES PATENTS

| Number | Name | Date |
|---|---|---|
| 1,170,069 | Ihrig | Feb. 1, 1916 |
| 1,414,993 | Milburn | May 2, 1922 |
| 1,516,857 | Kavaney | Nov. 25, 1924 |
| 1,560,238 | Hoyt et al. | Nov. 3, 1925 |
| 1,750,354 | Pogue | Mar. 11, 1930 |
| 1,790,991 | Marquette | Feb. 3, 1931 |
| 1,881,049 | Garner | Oct. 4, 1932 |

FOREIGN PATENTS

| Number | Country | Date |
|---|---|---|
| 307,071 | Italy | Apr. 12, 1933 |
| 667,612 | Germany | Oct. 20, 1938 |